United States Patent [19]

Berfield et al.

[11] Patent Number: 4,650,200
[45] Date of Patent: Mar. 17, 1987

[54] DOLLY WITH TANK HOLDING DEVICE

[75] Inventors: Robert C. Berfield, Jersey Shore; Robert L. Crevling, Jr., Williamsport; Donald G. Rightnour, Cogan Station, all of Pa.

[73] Assignee: Shop-Vac Corporation, Williamsport, Pa.

[21] Appl. No.: 803,254

[22] Filed: Dec. 2, 1985

[51] Int. Cl.4 ............................................. B62D 3/08
[52] U.S. Cl. ................................ 280/47.26; 248/154; 280/47.34
[58] Field of Search ..................... 280/47.34, 47.37 R, 280/79.2, 79.1 A, 33.99 F, 47.26, 47.31; 248/129, 154; 211/71, 74

[56] References Cited

U.S. PATENT DOCUMENTS

| | | | |
|---|---|---|---|
| 1,598,135 | 8/1926 | Heinson | 248/154 |
| 2,114,735 | 4/1938 | Crilly | 248/121 |
| 2,313,115 | 3/1943 | Allen | 248/154 |
| 2,389,574 | 11/1945 | Hulquist | 280/47.34 |
| 2,699,339 | 11/1955 | Benstein | 280/47.34 |
| 2,930,561 | 3/1960 | Bittle | 248/154 |

Primary Examiner—John J. Love
Assistant Examiner—Michael Mar
Attorney, Agent, or Firm—Ostrolenk, Faber, Gerb & Soffen

[57] ABSTRACT

A dolly includes a frame-like base that supports a cylindrical canister on its closed lower end. A U-shaped latch member slidably mounted on the base is movable relative thereto between releasing and holding positions. In moving to the latter position, an aperture or slot in the latch member receives a bead that surrounds the sidewall of the canister at the bottom thereof. Notches in the base receive the canister to position the latter. These notches also limit relative movement between the canister and the base to that required for the notch aperture to move clear of the bead for separating the canister from the base to empty to the former.

16 Claims, 9 Drawing Figures

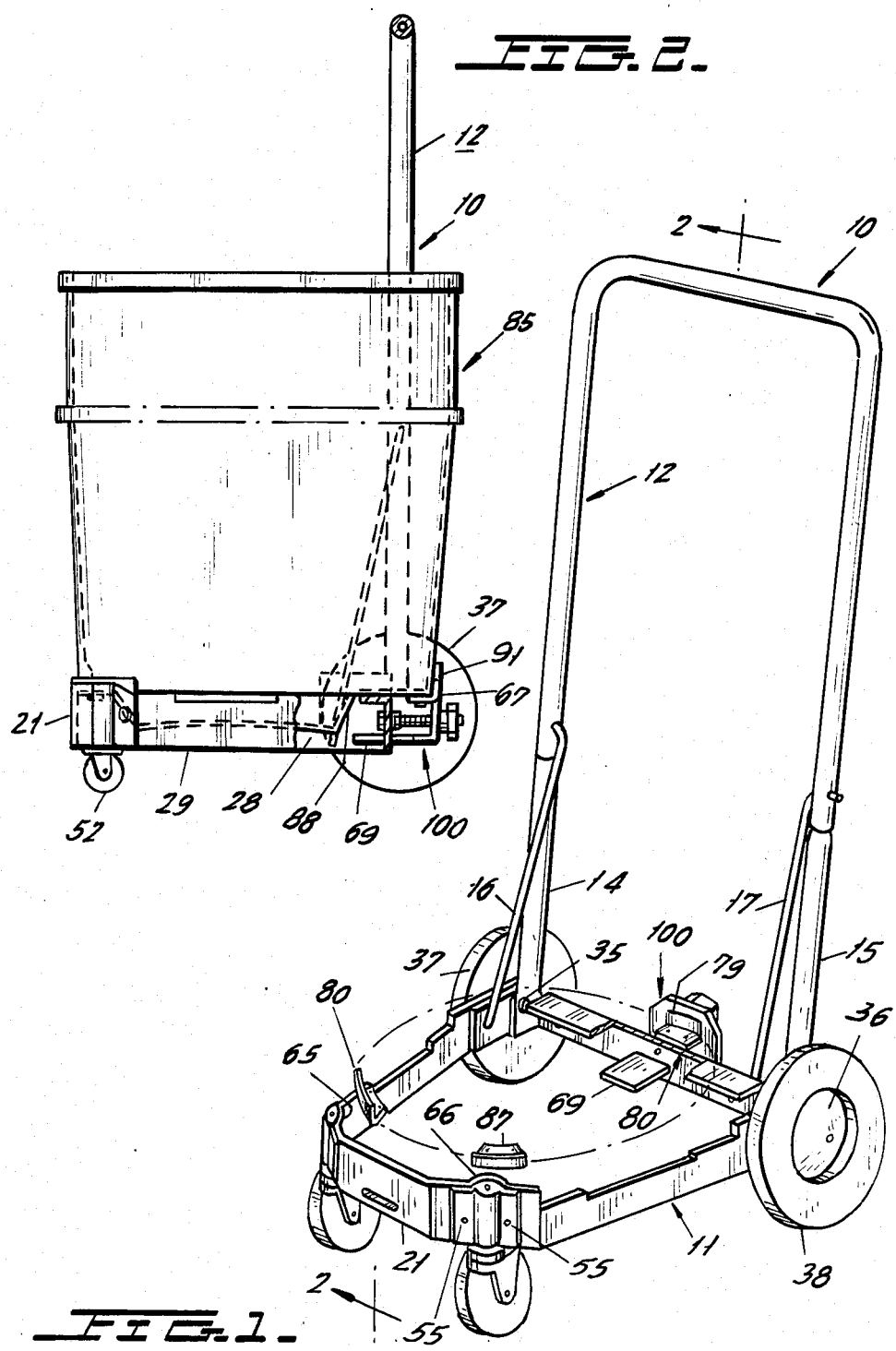

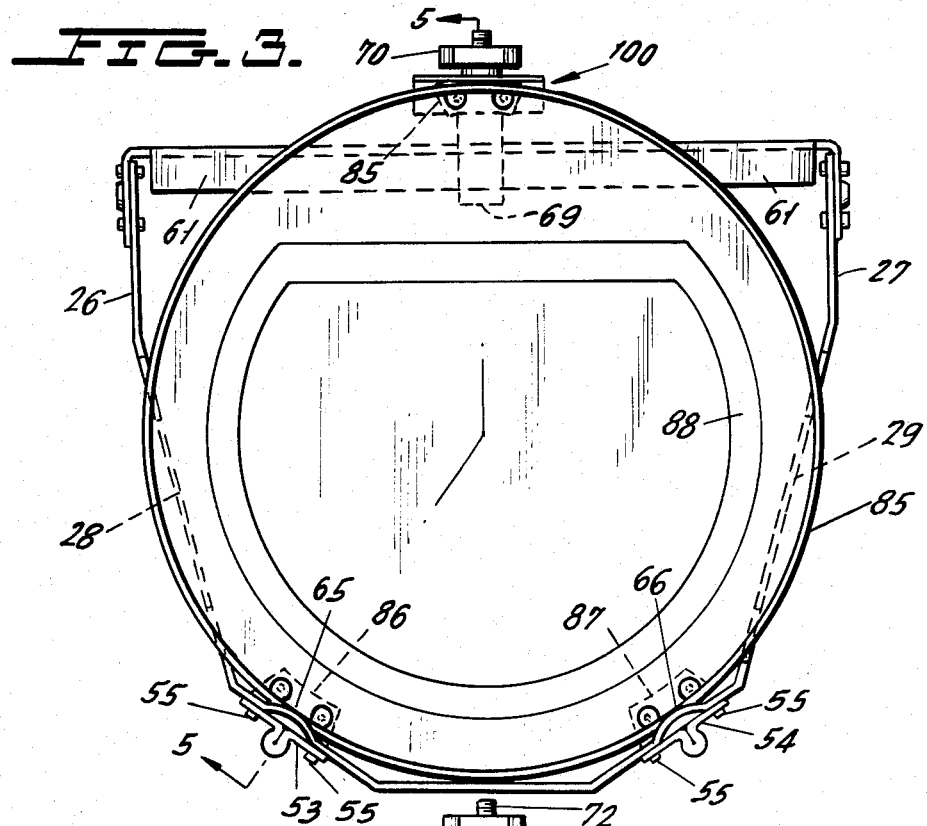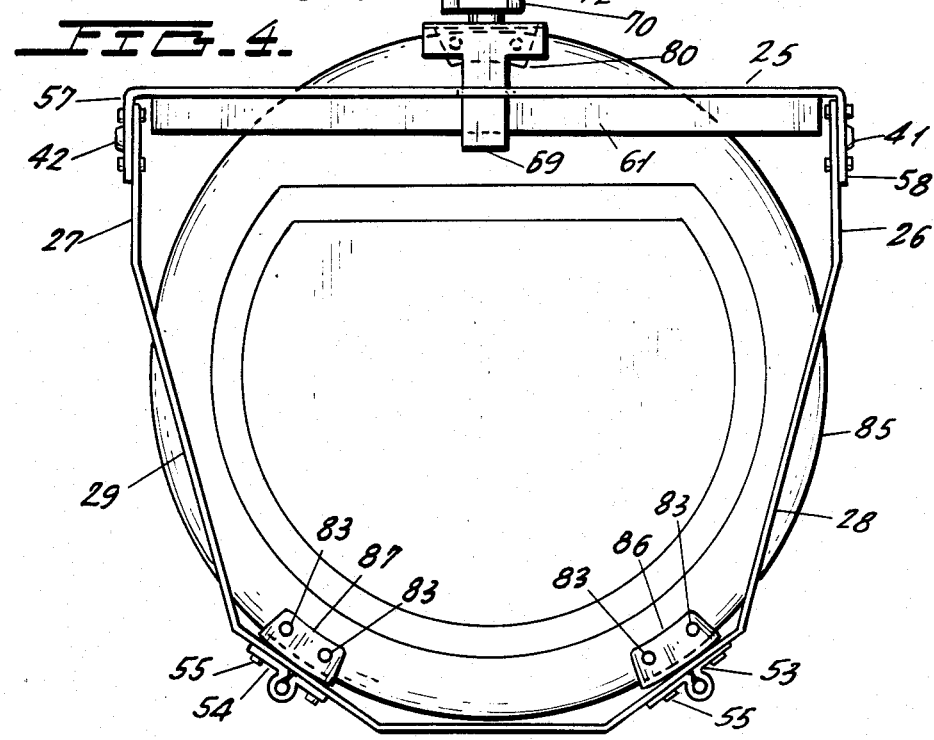

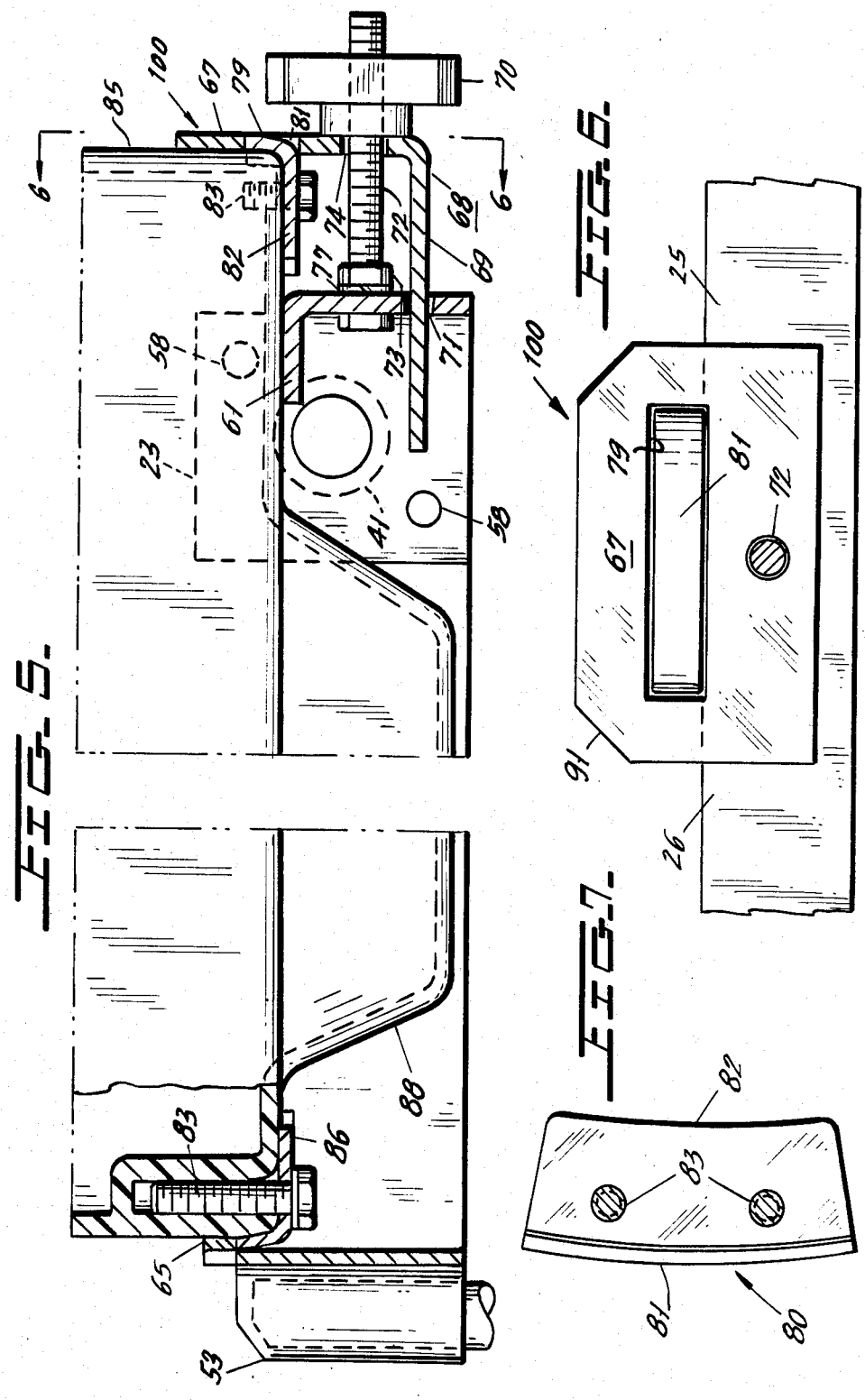

DOLLY WITH TANK HOLDING DEVICE

BACKGROUND OF THE INVENTION

This invention relates generally to hand carts and dollies, and more particularly relates to a latching means for securing a tank to a dolly.

In the prior art dollies for transporting barrels or tanks standing on end have been provided with means of various types to secure the load to the dolly. For the most part, the holding means was secured to the handle that extends upward from the dolly base. Typical prior art constructions of this type are disclosed in U.S. Pat. Nos. 1,220,640, 1,936,664, 2,114,735, 2,291,984, 2,740,981, 3,356,383 and 4,222,145.

Another construction, disclosed in the R. C. Berfield copending U.S. application Ser. No. 703,008, filed Feb. 19, 1985, entitled Dolly With Tank Latch, and assigned to the assignee of the instant invention, discloses a construction in which the holding means is pivotally mounted at the rear of the dolly base.

SUMMARY OF THE INVENTION

In accordance with the instant invention, a dolly is provided with a releasable latch means including a bracket that is slideably mounted to the base of the dolly at the rear thereof and is movable between a forward latching position and a rearward releasing positions where it is, respectively, engaged with and disengaged from a bead on the side wall of the tank near the bottom thereof. In moving to its latching position, the latch forces the tank forward so that sections of the bead move beneath one or more holding projections on the base and thereafter a slot type opening in the latch receives another section of the bead to hold the tank in latching position.

The bracket is shaped so that portions thereof most likely to be engaged by the user or to engage the tank do not have sharp corners to thereby reduce the likelihood of personal injury and damage to the tank.

Accordingly, the primary object of the instant invention is to provide a dolly having novel improved releasable drum holding latch means.

Another object is to provide a dolly with improved latch means that is simple to operate.

Still another object is to provide a dolly having a latch means that is slideably mounted to the base thereof.

A further object is to provide a dolly with an improved latch means that includes a latching bracket that is constructed to avoid accidentally damaging a tank supported on the dolly.

A still further object is provide a dolly having an improved latch that includes a latching bracket so constructed that the likelihood of personal injury is substantially reduced.

BRIEF DESCRIPTION OF THE DRAWINGS

These objects as well as other objects of this invention shall become readily apparent after reading the following description of the accompanying drawings in which:

FIG. 1 is a perspective of a four-wheel dolly having a releasable tank latching means constructed in accordance with teachings of the instant invention.

FIG. 2 is a cross-section taken through line 2—2 of FIG. 1, looking in the direction of arrows 2—2, with a tank mounted on the dolly. In FIG. 2, the tank is provided with a discontinuous or segmented lower bead.

FIG. 3 is a top plan view of the dolly base with a tank mounted thereon.

FIG. 4 is a bottom view of the elements of FIG. 3.

FIG. 5 is a cross-section taken through line 5—5 of FIG. 3 looking in the direction of arrows 5—5.

FIG. 6 is a cross-section taken through line 6—6 of FIG. 5 looking in the direction of arrows 6—6.

FIG. 7 is a plan view of a lip segment.

In FIG. 9, the tank is provided with a continuous lower bead.

DETAILED DESCRIPTION OF THE PREFERRED EMBODIMENTS

Figure 8:
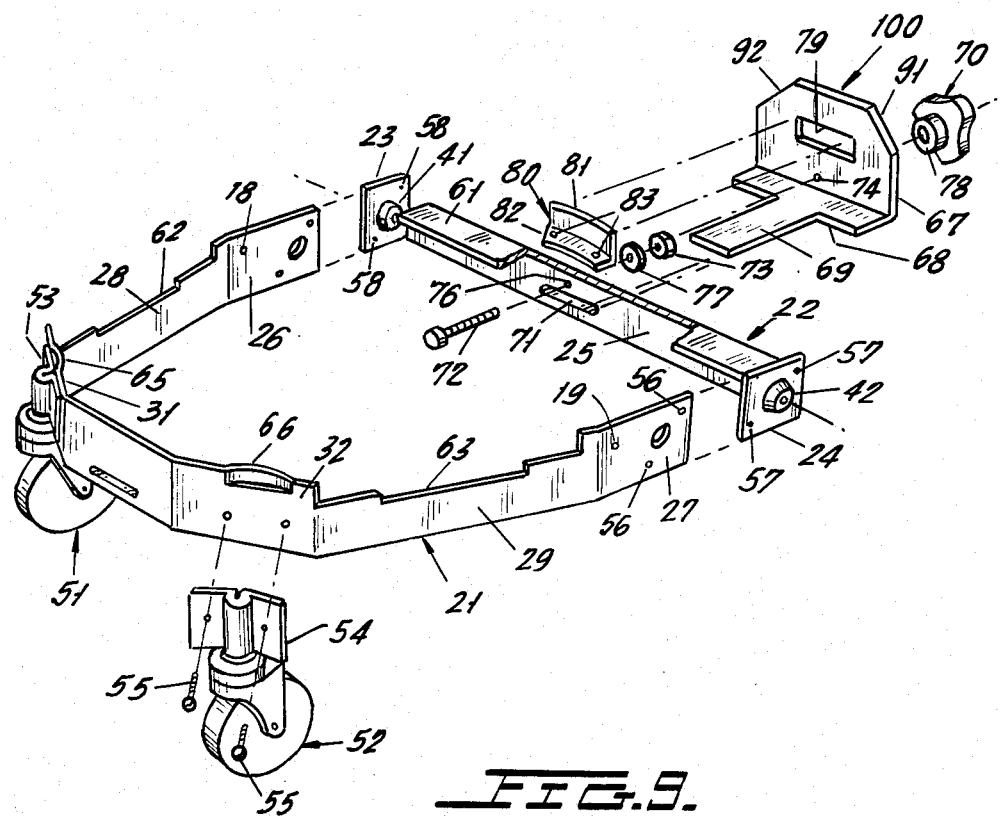
FIG. 8 is an exloded perspective of the elements of FIG. 3.

Now referring to the drawings. Hand cart or dolly 10 of FIG. 1 includes frame-like horizontal base 11 having handle 12 extending upward therefrom. Handle 12 includes inverted U-shaped tubular element 13 and extensions 14, 15 that extend downward from the U-arms, being partially telescoped therewith. Forwardly angled stabilizing rods 16, 17 extend downwardly from the regions where the respective extensions 14, 15 are overlapped by the arms of element 13. Offsets at the bottom ends of rods 16, 17 are received by the respective apertures 18, 19 (FIG. 8) in generally U-shaped front element 21 of base 11. The latter also includes portions 28, 29 that extend to the front section of base element 21 which includes oppositely directed angled portions 31, 32 at opposite ends of central portion 33 that is parallel to rear wall 25.

The lower ends of handle extensions 14, 15 are flattened and are disposed adjacent the inner surfaces of the respective side portions 26, 27. apertures (not shown) at the lower ends of extensions 14, 15 receive axle forming elements 35, 36 for relatively large wheels 37, 38 that are disposed outboard of base 11. Outward conical protrusions 41, 42 of extensions 23, 24 limit inward movement of wheels 37, 38 toward base 11. The front of base 11 is supported by two swivel-type caster units 51, 52 that are mounted to the respective front portions 31, 32 by the respective brackets 53, 54, each of which is operatively secured by two screws 55.

Two outward protrusions 56 from side section 27 are received by two apertures 57 in rear element extension 24 to operatively position one side of front element 21 relative to rear element 22. The other side of front element 21 is similarly positioned by outward protrusions of side portion 26 that are received by apertures 58 of rear element extension 23. For reasons to be hereinafter seen, the upper edges of the respective side portions 28, 29 are provided with the respective elongated notches 62, 63 and front portions 31, 32 are provided with the respective inward projections 65, 66. Further, the upper edge of vertical rear wall 25 is provided with inwardly protruding horizontal ledge 61.

Base 11 is adapted to support a cylindrical tank 85 standing on its closed bottom end. Typically, tank 85 constitutes the dirt collecting chamber of a bypass type vacuum cleaner whose suction-producing motor and fan (not shown) are removably affixed to tank 85 at the upper open end thereof.

Releasable latch or holding bracket 100 (FIG. 6) is of generally L-shaped cross-section and includes main section 67 that extends upwardly from the rear edge of horizontal auxiliary section 68. The latter includes central elongated guide 69 that extends forward through complementary rectangular guide slot 71 in rear wall 25. Screw 72 extends rearward through clearance aperture 76 in wall 25 and is secured thereto by nut 73 and lock washer 77. Main section 67 is disposed to the rear of wall 25 and.includes clearance aperture 74 through which screw 72 extends. The latter is threadably received by threaded central bore 78 of clamping knob 70.

Main section 67 also includes horizontally elongated rectangular slot-type opening 79 that is disposed above ledge 61 in position to receive the curved main portion 81 of bead section 80 (FIG. 7). Auxiliary portion 82 of bead section 80 extends horizontally from the lower edge of main portion 81 and is provided with two clearance apertures through which screws 83, 83 extend to secure bead section 81 to molded plastic tank 85 near the bottom thereof. Tank 85 is supported from below by base 11 with tank sump 88 being surrounded by base 11. Two additional bead sections 86, 87, of the same construction as section 80, are secured to the respective projections 65, 66 for a reason to be seen hereinafter.

Tank 85 is secured to dolly 10 by backing knob 70 to the right end of screw 72 (FIG. 5) and then placing tank 85 on the upper edge of base 11, with main portion 81 of bead section 80 in line with holding bracket aperture 79. Tightening of knob 70 moves holding bracket 100 forward so that main portion 81 of bead section 80 is received by slot 79. Continued tightening of knob 70 drives tank 85 forward so that bead sections 85, 87 move under the respective curved projections 65, 66 at the front of base 11 to cooperate therewith so that the latter block upward movement of the front of tank 85, just as the cooperation of bead section 80 and the upper boundary of slot 79 prevent upward movement of the rear of tank 85. Part of main section 67 above slot 79 is in direct contact with the side of tank 85.

Figure 9:
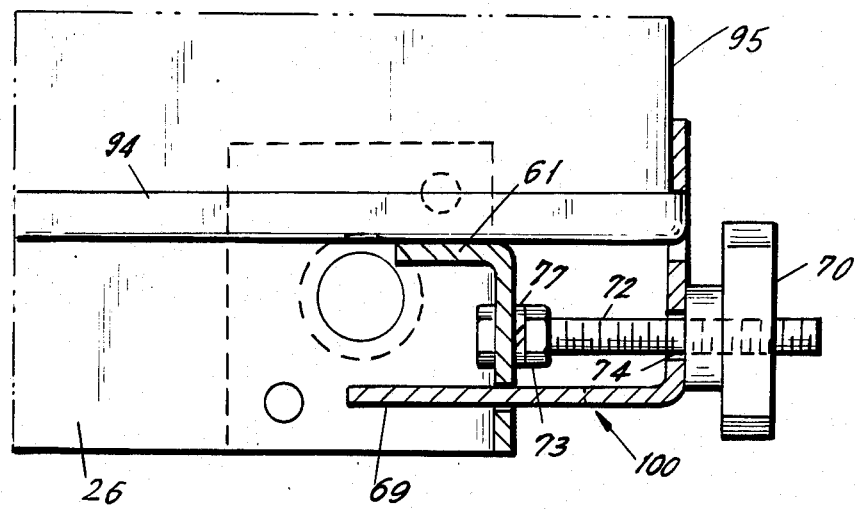
FIG. 9 is a fragmentary side elevation showing the holding bracket in its releasing position.

It should now be apparent to those skilled in the art that the length (horizontal dimension) of slot 79 may be selected so that the portions of bracket 100 defining the ends of slot 79 directly engage bead section 80. In this way some of the clamping forces are applied directly to the side of tank 85 and some of the clamping forces are applied to the bead section 80 rather than by having all of the clamping forces applied directly to the side of tank 85. Further, plastic tank 85 may be replaced by a tank 95 (FIG. 9) constructed of galvanized steel or other suitable metal and having a conventional continuous bead 94, or a segmented bead similar to elements designated 80, 86, 87. Corners 91, 92 for main section 67 of holding bracket 100 are sloped so as not to present sharp corners that may injure the user. This lack of sharp corners for bracket 100 minimizes the likelihood that bracket 100 will scratch, dent or mar painted metal surfaces.

Although the present invention has been described in connection with a plurality of preferred embodiment thereof, many other variations and modifications will now become apparent to those skilled in the art. It is preferred, therefore, that the present invention be limited not by the specific disclosure herein, but only by the appended claims.

What is claimed is:

1. A dolly for movably supporting a tank having a curved side-wall, a closed bottom and protruding means forming an outwardly disposed bead on the side-wall at the bottom thereof, said dolly including:

a base, wheel means on said base for horizontally positioning the latter, andlatch means on said base for maintaining a tank, supported by said base from below, latched to said base;

said base being frame-like and including a rear section, a front section, and side sections extending from opposite ends of said rear section to said front section;

said front section having inwardly protruding means operatively positioned to abut said side-wall of said tank at the intersection of said side-wall and said bead of said tank supported on said rear section and said side sections;

said latch means being mounted on said base at said rear section for movement between a forward tank latching position and a rearward tank releasing position;

said latch means when moved from said releasing position to said latching position forcing a portion of said bead forward beneath said inwardly protruding means; and said latch means also including an opening wherein another portion of said bead is captured with said opening when said latch means is in said latching position, with said latch means abutting said side-wall at the intersection of said side-wall and said another portion of said bead, whereby said tank is latched to said base.

2. A dolly as set forth in claim 1 which said side sections include walls having notch means extending downward from upper edges thereof;

said notch means being adapted to receive a lower section of a tank supported by said base to limit lateral movement of such tank and operatively position such tank on said base for cooperation of bead portions with said latch means and said inwardly protruding means to lock said tank to said base when said latch means is in said latching position.

3. A dolly as set forth in claim 2 in which said notch means is proportionhd to permit limited rearward movement of a tank suoported by said base, when said latch means is in said releasing position, to a position wherein the bead is clear of said inwardly protruding means to permit dismounting such tank from said base.

4. A dolly as set forth in claim 1 in which said latch means comprises a holding bracket that includes an upward section having said opening therein for directly engaging the bead, and another section extending forward from said upward section, said another section slidably received through a guide opening in said rear section.

5. A dolly as set forth in claim 4 in which said rear section includes sn elongated rear wall and a base strengthening and tank supporting ledge extending forwarding from said rear wall, said guide opening being in said rear wall.

6. A dolly as set forth in claim 5 in which the latch means also includes an adjustable clamping device connecting the holding bracket to the rear section.

7. A dolly as set forth in claim 6 in which the bead is discontinuous.

8. A dolly as set forth in claim 1 in which the opening of said latch means comprises a slot having a predetermined horizontal dimension whereby portions of said latch means adjacent opposite ends of said slot clampingly engage said bead.

9. A dolly as set forth in claim 8 in which the predetermined horizontal dimension is such that the latch means applies a predetermined distribution of clamping forces between the bead and the side wall of the tank.

10. A dolly as set forth in claim 5 in which the opening of said latch means comprises a slot having a predetermined horizontal dimension whereby portions of said latch means adjacent opposite ends of said slot clampingly engage said bead.

11. A dolly as set forth in claim 10 in which the predetermined horizontal dimension is such that the latch means applies a predetermined distribution of clamping forces between the bead and the side wall of the tank.

12. A dolly for movably supporting a tank having a curved side-wall, a closed bottom and protruding means forming an outwardly disposed bead on the side-wall at the bottom thereof, said dolly including:

a base, a wheel means on said base for horizontally positioning the latter, and latch means on said base for maintaining a tank, supported by said base from below, latched to said base;

said base being frame-like and including a rear section, a front section, and side sections extending from opposite ends of said rear section to said front section;

said front section having inwardly protruding means operatively positioned to abut said side-wall of said tank at the intersection of said side-wall and said bead of said tank supported on said rear section and said side sections;

said latch means being mounted on said base at said rear section for movement between a forward tank latching position and a rearward tank releasing position;

said latch means when moved from said releasing position to said latching position forcing a portion of said bead forward beneath said inwardly protruding means;

said latch means also including an opening wherein another portion of said bead is captured when said latch means is in said latching position whereby said tank is latched to said base;

said notch means being adapted to receive a lower section of a tank supported by said base to operatively position such tank on said base for cooperation of bead portions with said latch means and said inwardly protruding means to lock said tank to said base when said latch means is in said latching position; and said notch means being proportioned to permit limited rearward movement of a tank supported by said base, when said latch means is in said releasing position, to a position wherein the bead is clear of said inwardly protruding means to permit dismounting such tank from said base.

13. A dolly as set forth in claim 12 in which the opening of said latch means comprises a slot having a predetermined horizontal dinension whereby portions of said latch means adjacent opposite ends of said slot clampingly engage said bead.

14. A dolly as set forth in claim 13 in which the predetermined horizontal dimension is such that the latch means applies a predetermined distrubition of clamping forces between the bead and the side wall of the tank.

15. A dolly for movably supporting a tank having a curved side-wall, a closed bottom and protruding means forming an outwardly disposed bead on the side-wall at the bottom thereof, said dolly including:

a base, a wheel means on said base for horizontally positioning the latter, and latch means on said base for maintaining a tank, supported by said base from below, latched to said base;

said base being frame-like and including a rear section, a front section, and side sections extending from opposite ends of said rear section to said front section;

said front section having inwardly protruding means operatively positioned to abut said side-wall of said tank at the intersection of said side-wall and said bead of said tank supported on said rear section and said side sections;

said latch means being mounted on said base at said rear section for movement between a forward tank latching position and a rearward tank releasing position;

said latch means when moved from said releasing position to said latching position forcing a portion of said bead forward beneath said inwardly protruding means;

said latch means also including an opening wherein another portion of said bead is captured when said latch means is in said latching position whereby said tank is latched to said base; and the opening of said latch means comprising a slot having a predetermined horizontal dimension whereby portions of said latch means adjacent opposite ends of said slot clampingly engage said bead.

16. A dolly as set forth in claim 15 in which the predetermined horizontal dimension is such that the latch means applies a predetermined distribution of clamping forces between the bead and the side wall of the tank.

* * * * *

UNITED STATES PATENT AND TRADEMARK OFFICE
CERTIFICATE OF CORRECTION

PATENT NO. : 4,650,200
DATED      : March 17, 1987
INVENTOR(S) : Robert C. Berfield et al.

It is certified that error appears in the above-identified patent and that said Letters Patent is hereby corrected as shown below:

In claim 1, column 2, line 23, change "with" to --within--

Signed and Sealed this

Twentieth Day of June, 1989

Attest:

DONALD J. QUIGG

*Attesting Officer*         *Commissioner of Patents and Trademarks*